US006607818B1

(12) United States Patent
Satz et al.

(10) Patent No.: US 6,607,818 B1
(45) Date of Patent: Aug. 19, 2003

(54) COMPOSITE MATERIALS WITH BULK DECORATIVE FEATURES AND PROCESS FOR PRODUCING SAME

(75) Inventors: Richard Satz, South Orange, NJ (US); Lawrence E. Wolfe, Wallingford, PA (US)

(73) Assignee: Ronald Mark Associates, Inc., Hillside, NJ (US)

( * ) Notice: Subject to any disclaimer, the term of this patent is extended or adjusted under 35 U.S.C. 154(b) by 0 days.

(21) Appl. No.: 09/276,996

(22) Filed: Mar. 26, 1999

(51) Int. Cl.[7] .......................... B32B 5/16; B32B 27/38; B32B 27/00; B32B 17/06
(52) U.S. Cl. ..................... 428/323; 428/324; 428/325; 428/327; 428/328; 428/331; 428/413; 428/423.1; 428/425.9; 428/426
(58) Field of Search .................. 428/323, 324, 428/325, 327, 328, 331, 413, 423.1, 425.9, 426; 65/99.1

(56) References Cited

U.S. PATENT DOCUMENTS

| | | | |
|---|---|---|---|
| 3,267,187 A | 8/1966 | Slosberg et al. ............. 264/122 |
| 3,527,146 A | 9/1970 | Garling ............................. 94/5 |
| 3,928,706 A | 12/1975 | Gibbons ...................... 428/323 |
| 3,941,607 A | 3/1976 | Schuhboner ............. 106/281 R |
| 3,991,006 A | 11/1976 | Chandler ................... 260/40 R |
| 4,126,727 A | 11/1978 | Kaminski .................... 428/172 |
| 4,196,243 A | 4/1980 | Sachs et al. ................. 428/147 |
| 4,239,797 A | 12/1980 | Sachs ......................... 428/327 |
| 4,405,657 A | 9/1983 | Miller et al. ................ 428/54.1 |
| 4,456,643 A | 6/1984 | Colyer ........................ 428/156 |
| 4,501,783 A | 2/1985 | Hiraggami et al. .......... 428/147 |
| 4,530,856 A | 7/1985 | Kauffman et al. ........... 427/197 |
| 4,584,209 A | 4/1986 | Harrison ..................... 427/201 |
| 4,599,264 A | 7/1986 | Kauffman et al. ........... 427/264 |
| 4,760,103 A | 7/1988 | Kraft et al. .................. 523/150 |
| 4,797,314 A | 1/1989 | Davey et al. ................ 428/167 |
| 4,816,319 A | 3/1989 | Dees et al. .................. 428/167 |
| 4,879,143 A | 11/1989 | Rang .......................... 427/387 |
| 4,975,303 A * | 12/1990 | McKinnon .................. 427/263 |
| 5,017,632 A | 5/1991 | Bredow et al. .............. 523/400 |
| 5,178,912 A | 1/1993 | Piacente et al. ............. 427/278 |
| 5,230,945 A | 7/1993 | Dees et al. .................. 428/195 |
| 5,431,960 A | 7/1995 | Watts .......................... 427/359 |
| 5,445,880 A | 8/1995 | Martiny ...................... 428/323 |
| 5,506,030 A | 4/1996 | Landers et al. ............. 428/143 |
| 5,536,530 A | 7/1996 | Landers et al. ............. 427/197 |
| 5,571,588 A | 11/1996 | Lussi et al. ................... 428/46 |
| 5,627,231 A | 5/1997 | Shalov et al. ............... 524/523 |
| 5,667,888 A * | 9/1997 | Yoshida et al. ............. 428/336 |
| 5,686,507 A | 11/1997 | Hermele et al. ............ 523/153 |
| 5,787,655 A | 8/1998 | Saylor ......................... 52/181 |
| 5,787,667 A * | 8/1998 | Sheahan et al. ............. 52/315 |
| 5,789,032 A * | 8/1998 | Cong et al. ................. 427/346 |

FOREIGN PATENT DOCUMENTS

| | | |
|---|---|---|
| DE | 1504052 | 2/1970 |
| DE | 3540078 | 11/1986 |
| FR | 2310889 | 12/1976 |
| GB | 1119193 | 7/1968 |

OTHER PUBLICATIONS

Weast, Robert C., CRC Handbook of Chemistry and Physics, 1974, p. B-74.*

* cited by examiner

Primary Examiner—Holly Rickman
(74) Attorney, Agent, or Firm—Ostrolenk, Faber, Gerb & Soffen, LLP

(57) ABSTRACT

A visually decorative material having bulk decorative effects which may be used as a surface covering or for creating decorative objects, and the method of manufacturing same. The material is formed of a pigmented castable liquid vehicle such as a resinous polymer or glass having dispersed therein a quantity of discrete particles which have a higher specific gravity than the liquid vehicle. The material is formed by pouring the vehicle-particle composite onto a suitable backing. As the liquid flows onto the backing, the particles sink and disturb the uniformity of the pigment distribution. This causes the desired bulk decorative effects in the form of "comet-tails" and other dimensionally extended streaks and curves. The backing may be removed after the castable liquid solidifies or may be left in place to create a laminate. As a floor-covering, the material may be poured in place onto a suitable sub-flooring. A protective surface coating may also be applied to the solidified casting.

37 Claims, No Drawings

COMPOSITE MATERIALS WITH BULK DECORATIVE FEATURES AND PROCESS FOR PRODUCING SAME

FIELD OF THE INVENTION

The present invention relates to composite materials with visible bulk decorative features within the body of the material, and to methods for producing such materials in sheet or block form. Such materials are useful as surface coverings for walls, floors, furniture etc. and as materials for making jewelry or other decorative objects. Broadly speaking, such materials are formed of castable pigmented liquids and solid particles specifically chosen to interact mechanically with the pigments to produce bulk decorative effects in extended forms such as streaks, comet-tails, waves, curves, etc.

DESCRIPTION OF THE PRIOR ART

Various methods for producing decorative materials which can be formed as laminates and used as surface coverings or from which decorative objects can be produced are well-known.

For example, decorative laminates formed of sheet material of a resinous polymer composition, e.g. polyvinyl chloride, on a suitable substrate, e.g. a fibrous backing sheet, have been used for many years as sheet flooring. Similarly, laminates with simulated wood-grain or marbleized surfaces are used to produce furniture which is attractive and durable but inexpensive compared to natural materials.

Methods for producing such materials include mechanical embossing, chemical embossing or inlaying to provide contrasting surface finishes and other decorative effects.

Another type of decorative composite material consists of a transparent binder with embedded particles of various types. In these, the particles themselves provide decorative bulk effects and/or other functionality. Patents covering such materials include U.S. Pat. No. 3,941,607 to Schuhbauer which discloses a high traffic surface layer having chip grains, bituminous binder, and a high viscosity mortar; U.S. Pat. No. 3,950,581 to Maurin which shows a prefabricated tile panel having asbestos coated PVC chips; U.S. Pat. No. 4,126,727 to Kaminski covering a resinous polymer sheet containing mica, and transparent or translucent PVC chips; U.S. Pat. No. 4,257,834 to Iida which teaches a process for producing floor or wall sheet having a "chip like" pattern wherein the chips can be resin (PVC), inorganic, ceramic, metallic, stone, and wooden together with an epoxy or urethane resin; U.S. Pat. No 4,530,856 to Kauffman which is directed to a floor covering laminate having a textured and glossy finish, wherein various types of PVC resin particles are used.

To the extent these patents are concerned with decorative effects, however, such effects are achieved from the appearance of the embedded particles themselves. So far as applicants have been able to determine, the prior art does not disclose materials or processes for manufacturing materials in which bulk decorative effects are achieved in continuous or extended form such as streaks, waves, curves, etc. through mechanical interaction between the constituents.

SUMMARY AND OBJECTS OF THE INVENTION

Broadly stated, decorative materials produced in accordance with this invention are comprised of a castable, pigmented liquid vehicle of suitable viscosity as detailed below, and a quantity of dispersable particles having a high specific gravity relative to the liquid vehicle. The manufacturing process itself can be quite simple: after the constituents are thoroughly blended, the material is poured onto a suitable surface and allowed to set. The thickness of the casting can be adjusted mechanically and the surface textured or smoothed as desired. The liquid can be poured onto a backing material if desired to produce a laminate, and a protective coating can be added after the composite has set and/or hardened.

As the liquid is poured or cast, the included particles tend to float then sink due to the relationship of specific gravity to viscosity. The flow of the liquid is thus interrupted both vertically and horizontally by the movement of the particles, and the resulting non-uniformity of the dispersal of the pigment produces characteristic streaks, whirls, comet-tails and other extended bulk decorative effects.

Among the liquids which may be used are resinous polymers such as epoxy, PVC plastisols, acrylics, urethanes and the like, or other castable liquids such as glass. Any compatible colorant materials which have suitable light refracting properties may be used. A wide range of particle materials may be used, subject to the various requirements discussed in detail below. Such materials include chips or flakes formed of PVC, acrylic, urea or polyester etc., or natural materials such as mica, quartz, sand or metal.

The process according to this invention makes available a new class of decorative materials for use as floor and wall coverings, laminated surfaces for furniture and even artists materials. Additionally, these materials can be produced easily and inexpensively in continuous sheet form or as discrete blocks or other desired shapes.

It is accordingly a general object of this invention to provide a new class of decorative materials and methods of manufacturing such materials.

More particularly, it is an object of this invention to provide materials having dimensionally extended bulk decorative effects which may be as floor and wall coverings, as surfaces for furniture and for a variety of other decorative purposes.

A related object of the invention is to provide a convenient and cost effective process for manufacturing the materials of this invention.

Another object of the invention is to provide decorative materials having bulk decorative effects in the form of extended streaks, comet-tails, waves or other curves and the like.

A further object of the invention is to provide decorative materials comprised of a castable pigmented liquid vehicle and a quantity of dispersable particles having a high specific gravity relative to the liquid vehicle, as well as a method of manufacturing such materials.

A related object is provide decorative materials having bulk decorative effects which are achieved by mechanical interaction between a pigmented castable liquid vehicle and dispersed particles contained therein as the liquid is cast and cures and/or hardens.

A further related object is to provide such materials and the process for manufacturing same in which the decorative effects are in the form of extended streaks, comet-tails, waves or other curves and the like.

Yet another object of the invention is to provide decorative materials and methods for manufacturing the same in which the materials are comprised of a castable pigmented liquid vehicle and included particulate material, and in which the decorative effects are achieved by proper selection of the properties of the liquid vehicle and the particulate material relative to each other.

Other objects, advantages and novel features of the invention will become readily apparent to those skilled in the art from the following drawings and detailed description of a preferred embodiment of the invention.

DETAILED DESCRIPTION OF THE INVENTION

As noted above, the materials according to this invention are comprised of castable pigmented liquids and solid particles which interact mechanically with the pigmented liquid to produce the desired decorative effects. In accordance with several preferred embodiments of the invention, suitable liquids include resinous polymers such as epoxies, PVC plastisols, acrylics, urethanes and the like. Other non-resinous castable liquids such as glass may also be used.

As previously noted, any colorant materials which are compatible with the liquid vehicle and have suitable light refracting properties may be used. For resinous vehicles, preferred colorants include mica-based pigments such as Mearle Hilite Pearl manufactured by Engelhard Corporation of Iselin, N.J. or metallic pigments such as manufactured by Silberline Manufacturing Co., Inc. of Tamaqua, Pa.

A wide range of particulate materials may be used, subject to several specific requirements. A first of these is that the particles not be reactive or soluble in the liquid vehicle so that the particles maintain their discrete shape during the pouring and setting stages of the process. Similarly for a liquid vehicle such as glass which is cast at an elevated temperature, the particles must not be affected by the heat. Further, because the particles must briefly remain suspended in the liquid and then sink as the liquid flows, the specific gravity of the particles is an important factor. Related to this is the viscosity of the liquid vehicle. Particle size is also important in achieving the desired visual effects.

Suitable materials include chips or flakes formed of PVC, acrylic, urea or polyester etc., or natural materials such as mica, quartz, sand or metal, the latter being especially preferred when the liquid vehicle is molten glass. Good results have been achieved using particles having specific gravities in the range of about 0.80 to about 3.0. Particle sizes in the range of about two inches to about 400 mesh size may be employed, with a preferred range of about 40 $\mu$p to about 16 mesh size. Generally, the volume of particulates should not exceed about 75% of the composite material.

Liquid vehicle viscosities ranging from about 10 to about 148,000 centipoises are suitable, with best results being achieved with viscosities in the range of about 700 to about 1000 centipoises.

When a vehicle having relatively high viscosity is used, the specific gravity of the particles should be also be correspondingly higher for a given particle size to achieve more pronounced decorative effects. Particle size may also be increased to compensate for higher liquid viscosity but the corresponding patterns and the surface texture of the product will appear to be coarser.

The manufacturing process itself can be a simple, manual process, or can be automated in various ways which will be obvious to one skilled in the art from the present description. For example, the components of the resin system, the colorant and the particles are mixed together, with the order in which the constituents are added to the mixture depending on the particular resin system used. Blending is preferably done using a hand mixer, but a power mixer may also be used if it is of a type which does not cause introduction of a significant volume of air into the mixture. The mixture is then pre-cured if necessary and poured onto the desired substrate. To create floor tiles, wall covering panels or laminates for use in furniture manufacture, backing materials such as wood, fiberboard, or the like are preferred. For other applications, ceramics, metal or other materials may also be used. A suitable mold may be used to achieve the desired shape or the mixture may be poured without a mold and the edges finished after the resin has hardened. Alternatively, as a floor covering, the mixture may be poured in place directly on a concrete or plywood sub-flooring. The desired product thickness and surface appearance may be achieved using a roller or other suitable tool. To produce a starting material for use in making jewelry or other decorative objects, the pigmented vehicle-particulate mixture can be cast onto a glass substrate or onto a non-stick backing such a polyethylene, which may be removed after the resin has hardened.

Once the mixture has cured or hardened, a surface layer may be added to provide a smoother or more lustrous finish. The surface layer may be formed of any suitable material such as a urethane or polyester, if a harder, more protective surface is desired. This may be done using any suitable or conventional technique. Urethane coatings having a thicknesses in the range of about 1.0 to about 15.0 mils, or polyester coatings having a thicknesses in the range of about 1.0 to about 20.0 mils are preferred.

Further details concerning typical and preferred manufacturing processes, constituents and material characteristics may be found in the following illustrative examples, but it should be appreciated that these are intended to be illustrative only, and that the scope of the invention is to be measured by the appended claims.

EXAMPLE 1

For an epoxy based product, a composite material was created as follows:

| CONSTITUENT | QUANTITY (Per Square Foot of Product) |
|---|---|
| Resin (Dow 325) | 89.2 gm. |
| Hardener (Eastech Agent M) | 44.0 gm. |
| Pigment (Silberline 554YG) | 1.0 gm. |
| PVC Chips (18 mesh, sp. grav. 1.3) | 2.4 gm. |

The resin, pigment and chips were thoroughly blended with a hand mixer, and then the hardener is added. After further blending, the mixture is allowed to cure briefly to achieve a viscosity of between 700 and 1000 centipoises, as measured by using a Brookfield LV type viscometer, no. 3 spindle at 12 RPM (about two minutes). The material was poured onto a wood panel as a substrate, and nap rolled to a thickness of 50 to 55 mils per sq. foot. As the liquid flowed relative to the sinking particles, the uniformity of the pigment was disturbed, and marbleized "comet-tails" and other extended decorative effects were created. The effects were three dimensional due to the refractive properties of the pigment, and the apparent texture of the design varied with the angle at which the surface was viewed. After the resin was completely cured, the material was cut to produce finished straight edges.

EXAMPLE 2

The process of Example 1 was repeated, but after the mixture had cured, a urethane coating having a thickness of 10 mils was added. A smoother, more lustrous surface resulted.

EXAMPLE 3

The process of Example 1 was again repeated, but using PVC chips of 40 mesh size. The result was essentially similar except that the visual effects were smaller and the surface was smoother.

EXAMPLE 4

For a PVC plastisol based product, composite materials were created as follows:

| CONSTITUENT | QUANTITY (Per Square Foot of Product) |
| --- | --- |
| Dispersion Resin (Borden 1071) | 100 parts |
| Plasticizer (Butyl Benzyl Phthalate) | 50 parts |
| Epoxidized Soybean Oil | 5 parts |
| Stabilizer (Therm Check SP-1363) | 3.5 parts |
| Stabilizer (Therm Check 5526) | 1 part |
| Diluent (Aromatic 150) | 5.5 to 50 parts |
| Pigment (Mearle Hilite Pearl No. 9120C) | 5–10 parts |
| PVC Chips (18 mesh, sp. grav 1.3) | 10–20 parts |

The constituents were blended using a hand mixer, and the viscosity was adjusted to between 700 and 1000 centipoises, as measured by using a Brookfield LV type viscometer, no. 3 spindle at 12 RPM, by adding diluent. The mixture was poured and rolled to a thickness of 50 to 55 mils per sq. foot as in Example 1. Similar results were achieved, with the visual effects being more closely spaced for higher chip concentrations.

EXAMPLE 5

The process of Example 4 was repeated using PVC particles of 40 mesh size and various chip concentrations. The results were similar to those in Examples 3 and 4.

What is claimed is:

1. A decorative composite material having bulk decorative effects, the material comprising:
   a substantially transparent body of solidified castable liquid;
   a colorant substantially uniformly dispersed therein; and
   a quantity of dispersed particles,
   the specific gravity of the dispersed particles relative to the viscosity of the castable liquid being such that the dispersed particles sink as the liquid flows before becoming solidified, to form three dimensional extended non-uniformities in the dispersion of colorant visible in the body of the material.

2. A decorative composite material as described in claim 1 in which the solidified castable liquid is selected from the group consisting of an epoxy, an acrylic, a PVC plastisol, a polyester, and a urethane.

3. A decorative composite material as described in claim 2 further including a surface coating comprised of a resinous polymer.

4. A decorative composite material as described in claim 3 in which the surface coating is formed of a material selected from the group consisting of urethanes and polyesters.

5. A decorative composite material as described in claim 2 in which the particles are selected to have a specific gravity in the range of about 0.80 and about 3.0.

6. A decorative composite material as described in claim 5 in which the particles are of substantially uniform size in the range of about two inches to about 400 mesh.

7. A decorative composite material as described in claim 6 in which the particles are of substantially uniform size in the range of about 16 to about 40 mesh.

8. A decorative composite material as described in claim 7 in which the amount of particulates does not exceed 75% of the volume of the solidified casting.

9. A decorative composite material as described in claim 8 further including a surface coating comprised of a resinous polymer.

10. A decorative composite material as described in claim 9 in which the surface coating is formed of a material selected from the group consisting of urethanes and polyesters.

11. A decorative composite material as described in claim 10 further including a backing material permanently affixed to the solidified casting.

12. A decorative composite material as described in claim 1 on which the liquid vehicle is glass.

13. A decorative composite material as described in claim 1 in which the particles are selected to have a specific gravity in the range of about 0.80 and about 3.0.

14. A decorative composite material as described in claim 13 in which the particles are of substantially uniform size in the range of about 16 to about 40 mesh.

15. A decorative composite material as described in claim 13 in which the particles are of substantially uniform size in the range of about two inches to about 400 mesh.

16. A decorative composite material as described in claim 13 in which the amount of particulates does not exceed 75% of the volume of the solidified casting.

17. A decorative composite material as described in claim 1 in which the particles are of substantially uniform size in the range of about two inches to about 400 mesh.

18. A decorative composite material as described in claim 17 in which the particles are of substantially uniform size in the range of about 16 to about 40 mesh.

19. A decorative composite material as described in claim 1 in which the particles are of substantially uniform size in the range of about 16 to about 40 mesh.

20. A decorative composite material as described in claim 19 in which the amount of particulates does not exceed 75% of the volume of the solidified casting.

21. A decorative composite material as described in claim 1 in which the amount of particulates does not exceed 75% of the volume of the solidified casting.

22. A decorative composite material as described in claim 1 further including a surface coating comprised of a resinous polymer.

23. A decorative composite material as described in claim 22 in which the surface coating is formed of a material selected from the group consisting of urethanes and polyesters.

24. A decorative composite material as described in claim 23 including a backing material permanently affixed to the solidified casting.

25. A decorative composite material as described in claim 1 including a backing material permanently affixed to the solidified casting.

26. A decorative composite material having bulk decorative effects, the material comprising:
   a solidified castable liquid;
   a colorant substantially uniformly dispersed therein; and
   a quantity of dispersed particles,
   a specific gravity of the dispersed particles relative to the viscosity of the castable liquid being such that the dispersed particles sink as the liquid flows before becoming solidified, whereby dimensionally extended non-uniformities in the shape of comet tails are present in the dispersion of colorant in the vicinity of the dispersed particles.

27. A decorative composite material having bulk decorative effects, the material comprising:
  a substantially transparent body of solidified castable liquid;
  a colorant substantially uniformly dispersed therein; and
  a quantity of dispersed particles,
  the specific gravity of the dispersed particles relative to the viscosity of the castable liquid being such that relative movement of the dispersed particles and the liquid as it flows before becoming solidified, forms three dimensional extended non-uniformities in the dispersion of colorant visible in the body of the material.

28. A decorative composite material as described in claim 1, in which the particles comprise between about 5% and about 20% of the weight of the cast material.

29. A decorative composite material having bulk decorative effects, the material comprising:
  a substantially transparent body of solidified castable liquid;
  a colorant substantially uniformly dispersed therein; and
  a quantity of dispersed particles,
  wherein three dimensional extended non-uniformities in the dispersion of colorant are visible in the body of the material.

30. A decorative composite material as described in claim 29, in which the solidified castable liquid is selected from the group consisting of an epoxy, an acrylic, a PVC plastisol, a polyester, and a urethane.

31. A decorative composite material as described in claim 29, further including a surface coating comprised of a resinous polymer.

32. A decorative composite material as described in claim 31, in which the surface coating is formed of a material selected from the group consisting of urethanes and polyesters.

33. A decorative composite material as described in claim 29, in which the particles are selected to have a specific gravity in the range of about 0.80 and about 3.0.

34. A decorative composite material as described in claim 29, in which the particles are of substantially uniform size in the range of about 16 to about 40 mesh.

35. A decorative composite material as described in claim 29, in which the amount of particulates does not exceed 40% of the volume of the solidified casting.

36. A decorative composite material as described in claim 29, including a backing material permanently affixed to the solidified casting.

37. A decorative composite material as described in claim 29, in which the particles comprise between about 5% and about 20% of the weight of the cast material.

* * * * *